May 23, 1939.  P. ZALKIND  2,159,069
CABINET
Filed Aug. 15, 1934  3 Sheets-Sheet 1
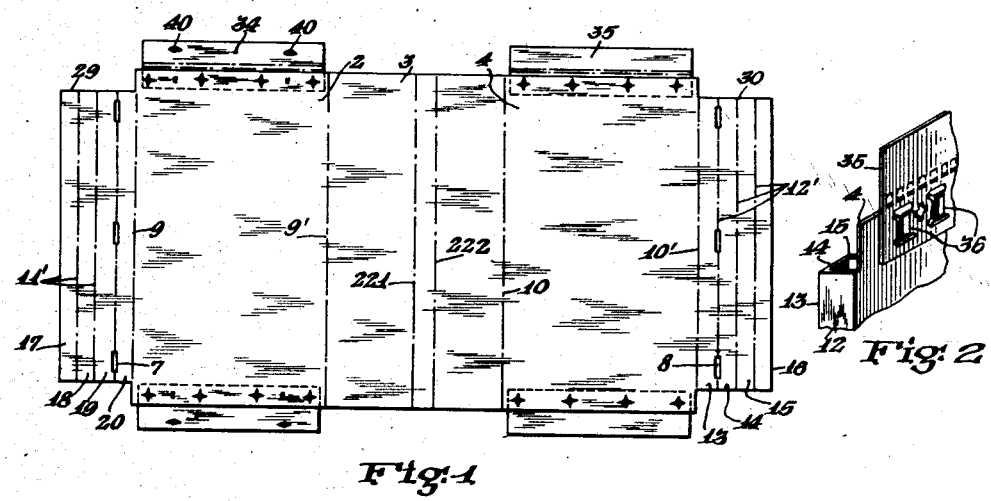
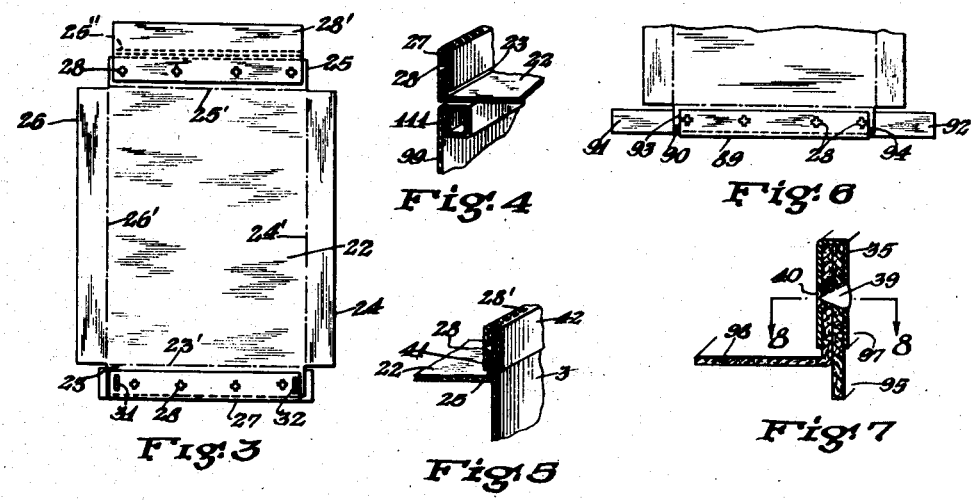
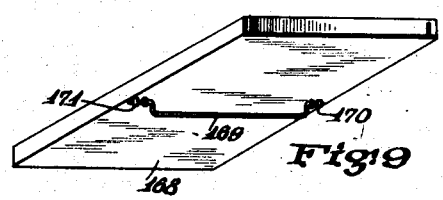
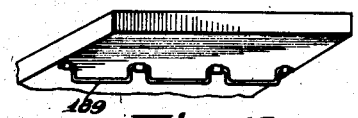
INVENTOR.
Philip Zalkind
BY Ostrolenk, Greene & Marsen
ATTORNEY.

May 23, 1939.    P. ZALKIND    2,159,069
CABINET
Filed Aug. 15, 1934    3 Sheets-Sheet 2
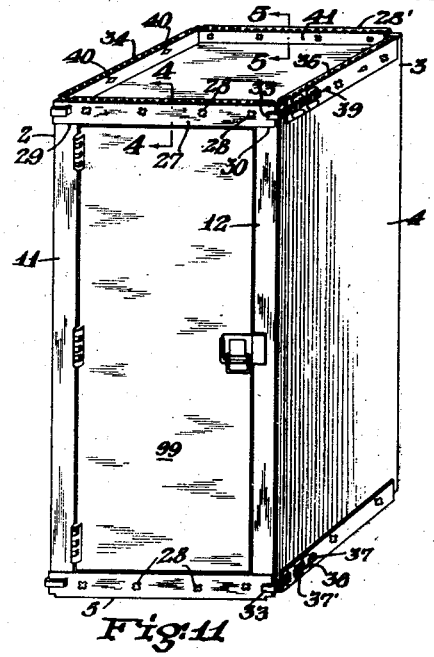
Fig. 11
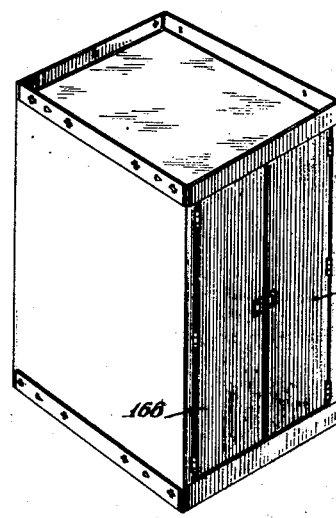
Fig. 12
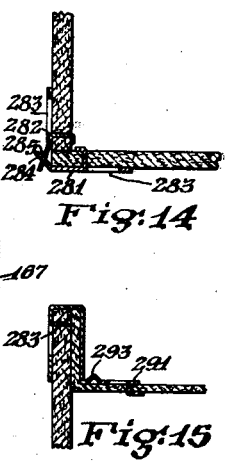
Fig. 14
Fig. 15
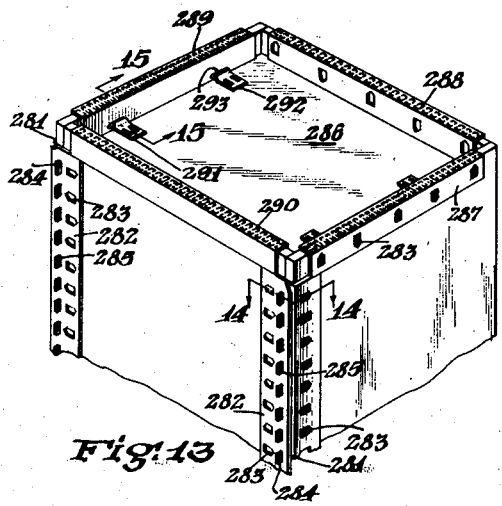
Fig. 13
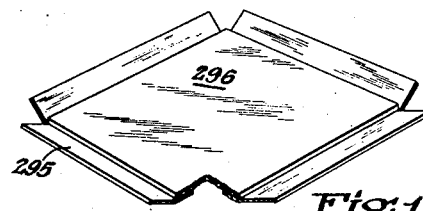
Fig. 16
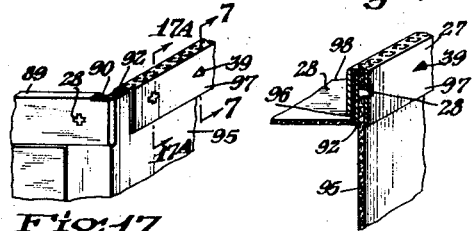
Fig. 17    Fig. 17-A
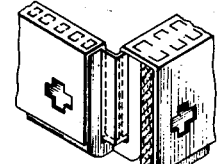
Fig. 20
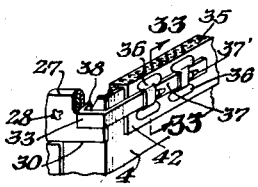
Fig. 18
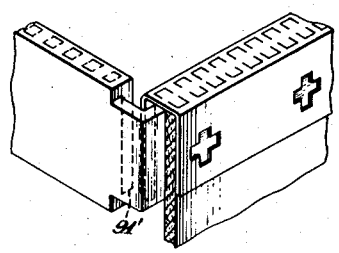
Fig. 21
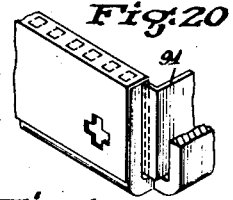
Fig. 19
INVENTOR.
Philip Zalkind
BY
ATTORNEY.

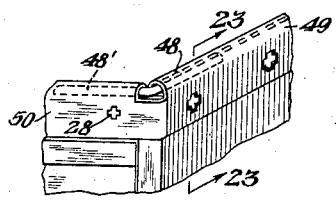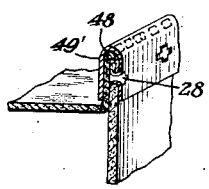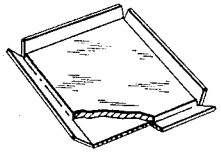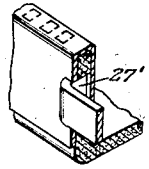
Fig. 22  Fig. 23  Fig. 24  Fig. 29
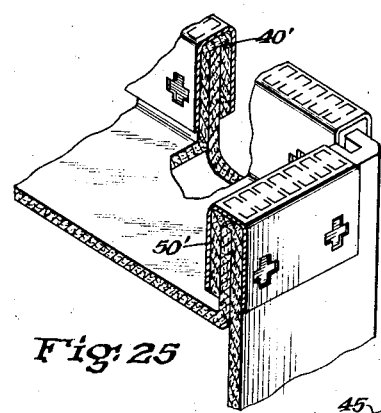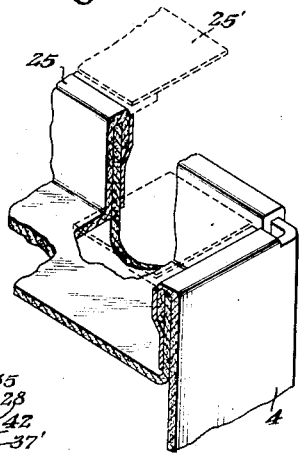
Fig. 25  Fig. 26
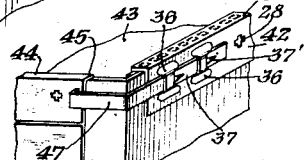
Fig. 32
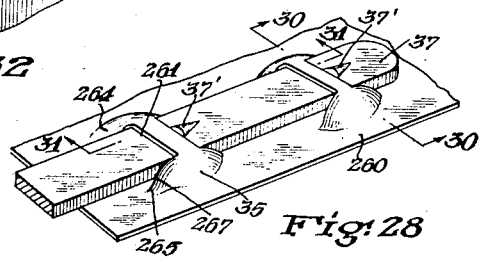
Fig. 28
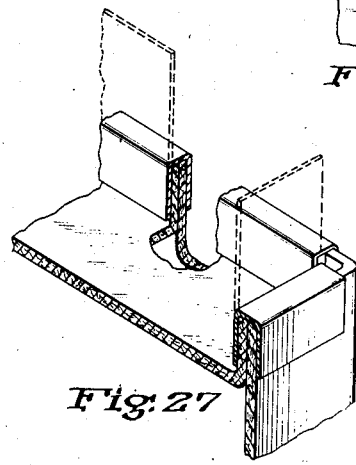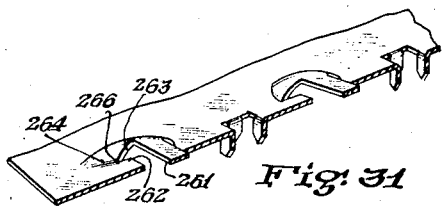
Fig. 27  Fig. 31
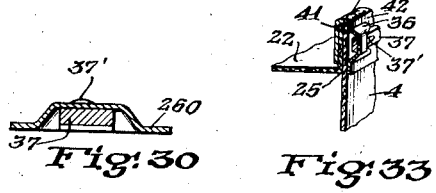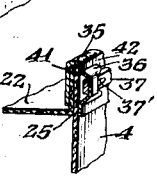
Fig. 30  Fig. 33
INVENTOR.
Philip Zalkind
BY
ATTORNEY.

Patented May 23, 1939

2,159,069

UNITED STATES PATENT OFFICE 2,159,069

CABINET

Philip Zalkind, New York, N. Y.

Application August 15, 1934, Serial No. 739,962

2 Claims. (Cl. 312—144)

My invention relates to containers and more particularly relates to collapsible cabinets, chests, and parts therefor.

Numerous attempts have been made to develop collapsible cabinets made of sheet and/or fibrous material such as plaster board, panel board, corrugated board, container board, fiber board, etc., which can be used for storage of clothing and the like.

Many such devices have been ineffective and inefficient in the accomplishment of the function for which they are designed. Hermetic tightness, strength, rigidity, adequate and strong top and bottom closure members all are essentials in the construction of this type of container or cabinet.

Accordingly, objects of my invention are to provide a novel construction for collapsible cabinets made of fibrous and/or other, preferably impervious, material which may be collapsed for shipment; which will provide efficient seals or closures, especially at the ends or top and bottom portions thereof; which has ruggedness to withstand the wear and tear consequent upon the continual insertion and which is inexpensive and simple in construction.

There are numerous other objects of my invention which will be apparent in the following detailed description and drawings, in which:

Figure 1 is an entire blank comprising rear and side walls, edge reinforcements and metal extensions for forming a cabinet as illustrated in Figure 11.

Figure 2 is a fragmentary view in perspective of the upper front corner of the cabinet of Figure 11, with top and U-shape clamp removed, showing the metal strip before being bent in.

Figure 3 is a plan view of a top or bottom member for the cabinet of Figure 11.

Figure 4 is a vertical section in perspective on line 4—4 of Figure 11.

Figure 5 is a vertical section on line 5—5 of Figure 11.

Figure 6 is a plan view of a portion of a modified form of top or bottom member in developed form.

Figure 7 is a vertical section in perspective on line 7—7 of Figure 17.

Figure 8 is a horizontal section on line 8—8 of Figure 7.

Figure 9 is a perspective view of the top member, showing one method of securing the iron-rod for hanging clothes.

Figure 10 is a perspective of a modification of the hanger support shown in Figure 9.

Figure 11 is a perspective view of the cabinet.

Figure 12 is a modified form of cabinet.

Figure 13 is a further modified form of cabinet.

Figure 14 is a cross-section through 14—14 of Figure 13.

Figure 15 is a cross-section through 15—15 of Figure 13.

Figure 16 is a perspective of a modified form of sunken end.

Figure 17 is a perspective view of a corner of a cabinet showing one form of construction therefor.

Figure 17A is a vertical section in perspective on line 17A—17A of Figure 17.

Figure 18 is a view similar to Figure 17 of a modified construction of the cabinet showing the construction of Figure 11.

Figures 19, 20, 21 are details of a modification of Figure 6.

Figure 22 is a view similar to Figure 18 showing a further modification of reinforced corners.

Figure 23 is a vertical section in perspective on line 23—23 of Figure 22.

Figure 24 is a perspective of a sunken end member showing the under portion made of substantially thin fibrous paper material with a reinforced main body portion.

Figures 25, 26 and 27 are perspective views of modifications of Figure 3.

Figure 28 is a detail of the member shown in Figures 18 and 32 for rigidly securing adjacent members to each other.

Figure 29 is a detail of a modification of Figure 18.

Figure 30 is a cross-section through 30—30 of Figure 28.

Figure 31 is a cross-section through 31—31 of Figure 28.

Figure 32 is a view similar to Figure 18 showing a modified construction of cabinet.

Figure 33 is a vertical section in perspective on line 33—33 of Figure 18.

Referring to Figure 1, I have shown a blank in developed form employed in carrying out my invention. As shown, the blank comprises three main sections 2, 3, and 4 with suitable score lines as at 9, 9', 10 and 10' for defining the sections.

When the blank is turned on the score lines 9' and 10, the sections 2 and 4 form the side wall of my cabinet and section 3 the rear wall.

Extending from section 4, I have provided a flap comprising units 13, 14, 15 and 16 suitably separated by the score lines 12' and having longitudinal slots 8 therein. A similar flap consisting of units 17, 18, 19 and 20 extending from section 2, and separated by score lines 11', are also provided with longitudinal slots such as 7.

The sections 13, 14, 15 and 16, and sections 17, 18, 19 and 20, when turned on their score lines, form vertical posts which may reinforce the front of the cabinet and assist in supporting top and bottom members where that is required, and may be secured in formed position by gluing, stapling or other suitable means.

Such posts may be co-extensive with the cabinet walls, they may also be cut-away as shown in Figure 1 or in any other suitable manner to form the lowered seat, as illustrated at 14, Figure 2.

The top and bottom portions of the cabinet comprise sunken end members such as described in my application Serial No. 693,841, filed October 16, 1933, of which this application is a continuation in part. Such a member is shown in detail in Figure 3 and consists of a main section 22 with flap extensions 23, 24, 25 and 26. The front and back edges of this member, defined by the score lines 23' and 25', and the sides, defined by the score lines 24' and 26', have dimensions corresponding to the widths of sections 3, 2 and 4 respectively, of the blank of Figure 1, so that when the flaps 23 to 26 are turned on their respective score lines at right angles to the plane of section 22, this section will fit into the top and bottom of the cabinet.

Secured to the flap 25 is a metallic member 28' having a grid work 25", the details of which are described in the co-pending application referred to above. This grid work consists mainly of perforations or slots formed along a line in the metal to predetermine a bending line about which the metal tends to bend when pressure is applied to the outer edge of the metal section.

As described in that co-pending application, the metal member is also secured to the tongue 25 by prongs 28 which are stamped out of the metal and substantially at right angles thereto. Secured as by prongs 28 punched from the metal to the second tongue 23 is a second metallic member 27 and having a similar grid work to permit the metal to be bent into a U shape about the edge of the tongue and encasing the tongue as shown in more detail in Figures 4 and 5.

The extensions 91 and 92 of Figure 6 may protrude from the portion of the metal in contact with the front surface of the tongue. The purpose of these will be described in more detail hereinafter.

Transverse slots 31 and 32 (Figure 3) may be provided near the outer ends of flap 23 and metal member 27 and extend through from the outer to the inner side, to form a socket for a locking member securing the side and end walls in assembled position, as will be shown hereinafter.

After the blank of Figure 1 with the posts formed as described above, has been turned on its score lines to form the side and back walls, the sunken end member 22 (Figure 3) is slipped into place at the top with the tongues 24 and 26 at right angles to main section 22 and in face-to-face relation with the side walls, and on the sides opposite the metal members 34 and 35 (Figure 1).

Members 34 and 35, made of metal, are secured near the upper edges of members 2 and 4 (Figure 1) by means of prongs punched out of the metal, as already described, and have a grid work of perforations forming a bending line along the upper edge of the two sections 2 and 4, to permit these members to be turned into U or channel shaped members.

Obviously, the spacing in the grid work for the metal strip 28' secured to the rear flap 25 is regulated in accordance with the thickness of the material to be encased by the metal when bent into a U. Thus, the front cross member 27 and the rear flange of the inset end, the former resting on the columns 11 and 12 and locked with the side flanges, and the latter having its channel resting on the rear wall, will prevent the top from being pushed inwardly by any pressure applied externally.

When the sunken end member of Figure 3 has been inserted in place, the metal members 34 and 35 (Figure 1) are bent inwardly about their score lines until they engage the inner surface of flaps 26 and 24 respectively to secure the sunken end member 22 to the cabinet body.

It will be noted that the width of tongues 24 and 26 correspond to the width of the material cut away at the corners of sections 2 and 4 to form the tongues 29 and 30. Accordingly, when the sunken end member 22 is mounted in place and the metallic members 34 and 35 are turned about their score lines, member 22 is engaged by the turned in edges of members 34 and 35 and is firmly seated thereby on the posts formed by members 29 and 30. In order to further secure the end 22 in place, metallic member 28' is now turned about its grid work until it engages the outer surface of the back wall 3.

The turning of the various metallic extensions about their grids and the adjacent tongues or walls is sufficient to secure the inset member in place. Also, the formation of the grid members, while predetermining a bend line, also tend to prevent or limit any spring effect tending to unfold the metallic tongues. One or more tooth-shaped prongs 39 (Figures 7 and 8) may, however, be provided at the lower portion of the strips and corresponding clamping tips 40 may be pressed out in the upper portion of the same strip to receive the prong 39. After the upper portion of the strips 34 and 35 have been turned about the perforations, as previously described, the prong 39, being of an angular shape, will press itself through lips 40 and anchor itself in place. Lips 40, of spring material, grip the sides of the prong, preventing it from withdrawing and holding the bent-over portion of strips 34 and 35 securely in place. The inset end may, of course, cooperate with any sunken end or sunken post formation which may be used to reinforce the cabinet; the inset end resting upon said posts. Likewise, the inset end need not interfere with the formation or mounting of a door at the open end of the cabinet and may even cooperate therewith.

In Figure 9, an inset end 168, forming the upper end of my cabinet, is shown having a cross bar 169 secured at both ends on the under surface by the bent prongs 170 and 171, serving as a means for the purpose of hanging clothes, and adapted to lie flat against the end piece for packing. Where the weight to be supported is considerable, I may provide a series of separate bails 169' (Figure 10) independently secured in any of my disclosed methods to the inset end.

It will now be clear that the cabinet blank of Figure 1 and the sunken end formation of Figure 3 may be used advantageously in the formation of a cabinet Figure 11 or Figure 12 which may have doors 99, or 166, 167.

In Figures 13, 14 and 15, I have shown a further modified form of blank in which each of the walls is preferably a separate and separable unit consisting of a rigid material such as metal ply board. They are normally disengaged from each other but may be interlocked to form an upright and rigid cabinet by means of interlocking members of metal such as 281 and 282, secured along the edges of the walls by means of prongs punched from the metal, as shown at 283.

The end walls are formed by sunken end members 286 similar to that already described hereinbefore, and are held in place by means of the grid works 287, 288, 289, and 290 in a manner already described in detail. In order further to insure a tight face-to-face contact between the flange member of the sunken end with the adjacent walls, the spring members 291 and 292, secured to the top face of the sunken end 286 by prongs are provided with V shaped ends 293 of a springlike property. The grid work 289 is bent about its perforated edge in a manner already described and turned into the space between the springy edges 293 and the sides of the cabinet. After it has been moved into place, it is rigidly held there by springs 293 in a manner shown in Figure 15.

If desired, the sunken end may be made of flaps 295 in Figure 16, with a relatively heavy main section 296 made of suitable paper or metal. Flaps 295 are secured to section 296 as by glue, etc.

In order to provide a rigid and tight connection for holding the front tongue 23 in place in its vertical position, the tongues 91 and 92 (Figure 6), preferably of metal or stiff cardboard, are turned at right angles to the plane of U shaped member 89 prior to turning the members 34 and 35 in, and are interposed between the faces of tongues 26 and 24 and side walls 2 and 4 respectively, so that when the members 34 and 35 are turned about their grid work, they will envelop these tongues as well as the side walls and maintain the sunken end in assembled rigid relation, as shown in detail in Figure 17.

It will be understood that in describing the modification shown in Figure 17, the sunken end member of Figure 3 was employed for purposes of clarity because it was shown in full, although these two forms are modifications of each other. The structure shown in Figure 17 is not provided with slots 31 and 32, as they are unnecessary for this modification, but are employed in connection with another form of corner securing means shown in Figures 11 and 18.

Although the members 91 and 92 (Figure 6) are shown and described as seated between the tongues of the sunken end and the respective side walls of the cabinet, it should be noted that alternatively they may be placed on the inside of the sunken end tongue and directly engaged by the turned over members 34 and 35 as illustrated in Figure 19.

Moreover, members 91 and 92 may be integral extensions of U member 89 as shown in Figure 20, or they may be one or two members inserted in the U member 89, with protruding portions at each end bendable into a right angle leg to be engaged with the members 34 and 35.

In a further modification, members 91 and 92 may comprise integral extensions of the sunken end tongue 90 as shown in Figure 21. In these latter modifications, U shaped member 89 may be eliminated if desired.

In all of these forms, the corners of the sunken ends and the walls of the container are tightly united by the members 91 and 92 into a rigid angle, the two edges forming the corner being in effect united as if they were an integral formation.

In a still further modification, I may employ the angle wires disclosed in the above identified application or in my application Serial No. 690,360 of which this application is a continuation in part. In such a modification shown in Figure 22 one leg 48' of the angle is secured in the U shaped member 50, preferably along its upper edge, and the other leg 48 is secured by member 49 also along its upper edge. It will be understood that member 49 is bent into place after leg 48 has been properly positioned.

Although I have, for purposes of illustration, shown one form of sunken end member (Figure 3), it will now be clear that I may use other forms shown in my application Serial No. 693,841, referred to above, one other such form being shown in Figure 24 in which the main blank is of thin material supported by a center piece of greater rigidity.

In the use of this cabinet as a moth preventive container, tightness and imperviousness is essential. To further insure these characteristics for my cabinet, I may make the tongue 25 (Figure 3) coextensive with the metal 28' and bendable therewith into engagement with the side walls as illustrated at 40' Figure 25. The side walls at 50' of the cabinet as shown in Figure 25 are similarly made coextensive with member 35 (Figure 1) to engage the sunken end and the members 91 and 92 being integral extensions of the flap 90, (Figures 6, 21, 25, 26 and 27), all together form edges which are closed and substantially impervious. Alternatively, members 28' (Figure 3) may be replaced by the integral extension of flap 25 Figure 26, which is provided with a tape 25' for securing the turned in extension to the side walls and similarly the member 35 (Figure 1) may be replaced by the integral extensions of the side walls, the latter provided with a tape for securing the turned in integral extension to the inside face of the sunken end as shown in Figure 27. Moreover, the metal member of both the sunken end and cabinet walls may be replaced by tape for securing the sunken end member in place.

In Figure 6, tongues 91 and 92 are shown and described for providing a rigid connection between adjacent walls. An alternative form is shown in Figure 28. As shown here, the guide loops or straps 35 (Figure 18) are stamped from the outer face of the metallic member 35. These straps, shown in detail in Figure 28 and which will be described more fully hereinafter, provide a space with the face 42 of U shaped metal clamp 35 sufficient to permit the longer leg 37 of angle member 33 (Figure 18) to be slipped into the space and locked in place by the lugs 37' punched from the member 33, which snap into place after being forced through the strap. The opposite end of member 33 has a reentrant projecting shorter leg 38 which slips into the slots 31 and 32 (Figure 3) in the U shaped member 27, as shown in Figure 18, and rigidly secures the side and front walls to each other, as shown in the assembly of Figure 11.

Although slots 31 and 32 are described and shown as extending through the metal and flap, the slot may extend for just a sufficient depth to provide a socket for the reentrant portion of the leg as shown at 27' Figure 29. Moreover, to further insure imperviousness to the cabinet, the slots or sockets 31 and 32 may be entirely eliminated and straps may be formed in the member 44 similar to straps 36, and lugs formed in the leg 47 similar to lug 37' for engaging and securing the second leg. It will also be obvious that the lugs 37' may be formed in the straps and arranged to slip into a depression in the angle member.

Although this is described as a modification of the structure shown in Figure 6, it will be understood that where greater rigidity and imperviousness are desired, both the members 91 and 92 of Figure 6 and the angle member 33 of Figure 18 may be used together.

In Figures 28, 30, and 31, I have disclosed in detail the construction of the straps 35 of Figure 32. As shown in these figures, the strap is formed by slitting the material 260 along the line 261 and at right angles to line 261 as at 262 and by stamping the metal along the slit 262 to form the shoulder 263 and the strap 36. The metal is so formed that the distance between the beginning of the raised portion, as at 264, and its corresponding portion at the opposite end of the slitted member, as at 265 in Figure 28, is spaced further apart than the point 266 at the beginning of the slit and its corresponding point at the opposite end of the strap as at 267, Figure 28. The result is that a truncated cone or funnel is formed at the entrance to the space formed by the strap 261 for guiding the member 37 into place.

The shoulders 263 increase the strength of the weakened material at the slit against any shearing action by the member 37, due to twisting or sidewise motion thereof in response to strains on the cabinet. In actual practice it was found that the member 37, though made of very much heavier gauge metal, tended to yield and become distorted in shape before the shoulder gave way when an edgewise shearing strain was applied to the heavier gauge part.

In the above I have attempted to describe various modifications of my invention carrying out the basic principle, but it will be understood that these are merely for purpose of illustration, and I do not intend to be limited to these specifically, but only so far as set forth in the appended claims.

In the above I have described several modifications of the cabinet made from sheet materials such as corrugated board, fibre board, box board of various kinds and the like.

It will appear clearly from the foregoing constructions I may use rigid material such as corrugated board, plywood, and the like in conjunction with a suitable method of joining and hinging.

It is obvious that for various uses of the structure herein, I may provide materials which will be impervious to the passage of gases, where moth-proofing is to be accomplished by vaporizing or sublimating products; I may use laminated sheets, with metal laminated upon a fibrous sheet and so arranged that the bending line of the entire sheet may be predetermined by the bend line of the fibrous sheet; I may also use a sheet metal and fibre laminated sheet with the bend line in the metal; I may use fibrous sheet material treated to be fire-resistant; or where the material is laminated, the adhesive agent may be a product similar in action to silicate of soda to produce a fire-resistant sheet; and I may use insulating materials of various kinds.

Many uses of my invention in addition to those specifically disclosed will be obvious. I intend, however, to be limited only by the appended claims.

I claim:

1. A cabinet having an open front side and comprising three side walls made of sheet material having fold lines along which the same is manually foldable to form said walls, an inset for the top and bottom engaging the upper and lower edges of said side walls, and metallic members secured to the end edges of said walls and foldable on predetermined score lines into a U for engaging the adjacent edge of said inset to secure said inset from falling away from said cabinet and a metallic member secured to an edge of said inset and foldable on predetermined score lines into a U for engaging the adjacent cabinet wall, for securing said inset in place.

2. A cabinet having an open front side and comprising three side walls made of sheet material having fold lines along which the same is manually foldable to form said walls, an inset for the top and bottom engaging the upper and lower edges of said side walls, metallic members secured to the end edges of said walls and turned into a U for engaging the adjacent edge of said inset to secure said inset from falling away from said cabinet and a metallic member secured to an edge of said inset and turned into a U for engaging the adjacent cabinet wall, for securing said inset in place, and angle members interengaging adjacent metallic members and securing said members to each other.

PHILIP ZALKIND.